United States Patent [19]
Dieringer

[11] Patent Number: 5,790,947
[45] Date of Patent: Aug. 4, 1998

[54] RADIO AND PUBLIC ADDRESS INTERFACE KIT

[76] Inventor: Michael D. Dieringer, 27225 Sunnyridge Rd., Palos Verdes, Calif. 90274

[21] Appl. No.: 678,633

[22] Filed: Jul. 10, 1996

[51] Int. Cl.[6] .................................................. H04B 1/06
[52] U.S. Cl. ............................................ 455/345; 455/351
[58] Field of Search .................................. 455/73, 89, 90, 455/95, 99, 128, 345, 347, 351, 575; 379/430; 340/384.4, 384.72

[56] References Cited

U.S. PATENT DOCUMENTS

| | | | |
|---|---|---|---|
| 4,117,262 | 9/1978 | Peecher | 455/74 |
| 4,212,485 | 7/1980 | Kramb | 280/766.1 |
| 4,357,711 | 11/1982 | Drefko et al. | 455/89 |
| 4,788,724 | 12/1988 | Lazzeroni et al. | 455/351 X |
| 5,142,700 | 8/1992 | Reed | 455/351 X |
| 5,296,840 | 3/1994 | Gieffers | 340/384.4 X |

*Primary Examiner*—Thomas J. Mullen, Jr.
*Attorney, Agent, or Firm*—Merchant, Gould, Smith, Edell, Welter & Schmidt

[57] ABSTRACT

A remote push-to-talk (PTT) button for use on motorcycles with two-way radios and public address systems. The remote PTT enables the rider to use both the radio and public address systems from the helmet-mounted microphone while driving the motorcycle.

30 Claims, 6 Drawing Sheets

RADIO AND PUBLIC ADDRESS INTERFACE KIT

BACKGROUND OF THE INVENTION

1. Field of the Invention

This invention relates in general to a radio, helmet and public address (PA) interface kit. More particularly, the invention relates to a communications accessory kit that allows a motorcycle rider to communicate, using a microphone mounted in a helmet, over a belt-mounted two-way radio and a public address system.

2. Description of the Related Art

Two-way radios have been used for communication purposes for many years. The use of two-way radios for mobile communications has become prevalent commercially and in police and military environments. Two-way radios for police motorcycles are especially prevalent, since motorcycle police are usually alone and rely on the radio for their sole contact point with other police.

The two-way radio that motorcycle police use is most commonly located on the belt of the policeman. Motorcycle policemen are required by law to wear helmets, forcing the motorcycle police to have earphones and a microphone installed in the helmet to enable radio use while driving the motorcycle. However, the rider has difficulty using the radio while driving, since both hands are needed on the handlebars to drive, control speed, and brake the motorcycle.

It can be seen then that there is a need for a way for the policeman to be able to safely and easily use the two-way radio while driving the motorcycle. It can also be seen that there is a need for the policeman to be able to continue using the two-way radio at a distance greater than a few feet from the motorcycle.

SUMMARY OF THE INVENTION

To overcome the limitations in the prior art described above, and to overcome other limitations that will become apparent upon reading and understanding the present specification, the present invention discloses a motorcycle communications system for enabling a rider to use a two-way radio and a public address system with a microphone mounted in a helmet. The present invention is comprehensive, fully integrated with current motorcycle communications systems designs, easy to use, and extendable.

The present invention solves the above-described problems by providing a remote push-to-talk (PTT) switch that remains with the rider as the rider moves away from the motorcycle, and two remote PTT switches mounted on the handlebars of the motorcycle. Both sets of switches allow the rider to use the helmet-mounted microphone with both the radio and public address (PA) system.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

System Components

The present invention is a motorcycle communications system that allows a helmet-mounted microphone to be used with both a two-way radio and a public address system. An electrical interconnect assembly provides an electrical interconnect between the helmet, two-way radio, and the public address system, wherein the electrical interconnect assembly includes one or more switches for electrically connecting the microphone in the helmet to both the two-way radio and the public address system.

Figure 1:
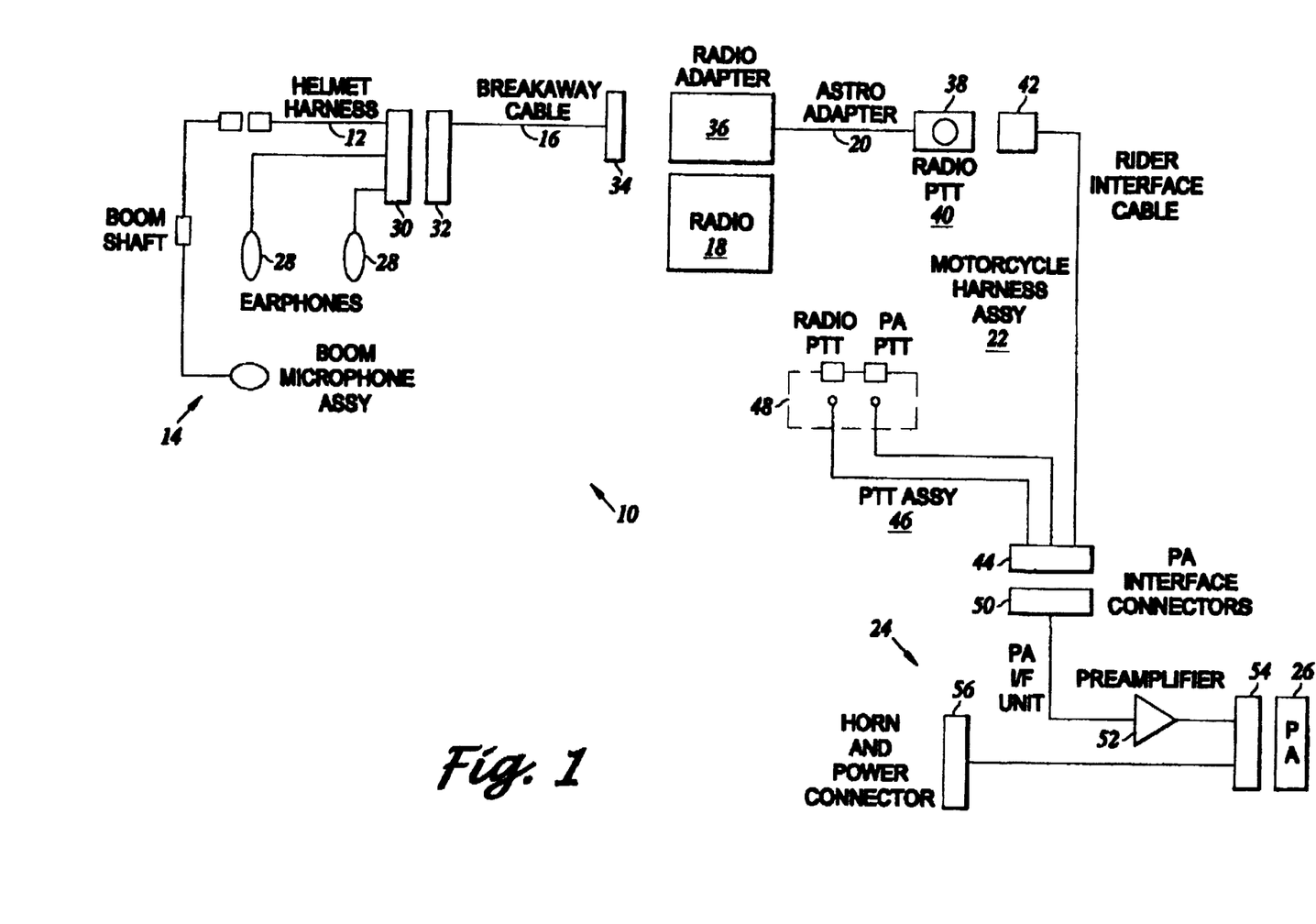
FIG. 1 is a schematic diagram of the communications system of the present invention.

FIG. 1 is a schematic diagram of the communications system 10 of the present invention, which comprises a helmet harness 12, microphone assembly 14, breakaway cable assembly 16, radio 18, radio adapter assembly 20, motorcycle harness assembly 22, public address (PA) assembly 24, and public address (PA) system 26.

In the helmet harness 12, two earphones or speakers 28 and the microphone assembly 14 are connected to a helmet connector 30. Typically, the earphones 28 and microphone assembly 14 are attached or otherwise an integral part of the motorcycle helmet, but they can also be part of a telephone headset or other portable device used for two-way communication. Preferably, the earphones 28 provide monaural, stereo, and/or multi-channel surround sound. The helmet connector 30 is typically mounted external to a motorcycle helmet, but can also be part of a cable that protrudes from the motorcycle helmet. Further, if the earphones 28 and microphone assembly 14 are part of a telephone headset, the helmet connector 30 may not be attached to any other structure, but may be a simple plug assembly.

The helmet connector 30 is coupled to the external connector 32 of the breakaway cable assembly 16, which also includes a breakaway connector 34. Either external connector 32, breakaway connector 34, or both, are designed to disconnect under a given force. For example, if enough axial force is placed on the connection between the external connector 32 and helmet connector 30, the connection will be broken.

The breakaway connector 34 is connected to a jack in a radio adapter 36 of the radio adapter assembly 20. The radio adapter 36 is also coupled to the radio 18. Preferably, the jack in the radio adapter 36 is molded into the adapter 36, and thus comprises a fixed jack. The radio adapter assembly 20 also includes a jack and switch assembly 38 for connecting to the motorcycle harness assembly 22. In the preferred embodiment, the jack and switch assembly 38 contains a push-to-talk (PTT) switch 40 that activates the microphone input to the radio. The radio adapter assembly 20 is preferably located proximate to the motorcycle's rider, such that the rider can selectively engage and disengage the functions of the microphone assembly 14 using the switch 40. In alternative embodiments, the push-to-talk (PTT) switch 40 could activate the microphone input to either the radio 16 or the public address system 26, or there could be multiple push-to-talk (PTT) switches 40 that activate the microphone input to the radio 16 and the public address system 26. Those skilled in the art will recognize that one switch 40 may perform multiple functions or multiple switches 40 may be used to perform multiple functions.

The jack and switch assembly 38 of the radio adapter assembly 20 is coupled to the motorcycle harness assembly 22 via a rider harness connector 42 when the motorcycle's rider is proximate the motorcycle. The motorcycle harness assembly 22 is comprised of a rider harness connector 42 and a handlebar switch assembly 46, both of which are coupled to an interface connector 44. The handlebar switch assembly 46, like the jack and switch assembly 38, contains one or more push-to-talk (PTT) switches 48 that control the talk functions of the radio 18 and the public address (PA) system 26. In the preferred embodiment, the handlebar switch assembly 46 includes two push-to-talk (PTT) switches 48. When a first one of PTT switches 48 is depressed, the microphone input to the radio 18 is activated, allowing the rider's voice to be transmitted over the radio 18 (or any other device connected to the radio adapter assembly 20). When a second one of the PTT switches 48 is depressed, the microphone input to the public address system 26 is activated, allowing the rider's voice to be transmitted over the public address system 26 (or any other device connected to the PA interface assembly 24).

The interface connector 44 of the motorcycle harness assembly 22 is coupled to a public address interface assembly 24 via a connector 50. The connector 50 is, in turn, coupled to a pre-amplifier 52, which itself is coupled to the public address system 26 via an interface connector 54. A horn, power and control interface connector 56 is also coupled to the interface connector 54.

Helmet Harness

Figure 2:
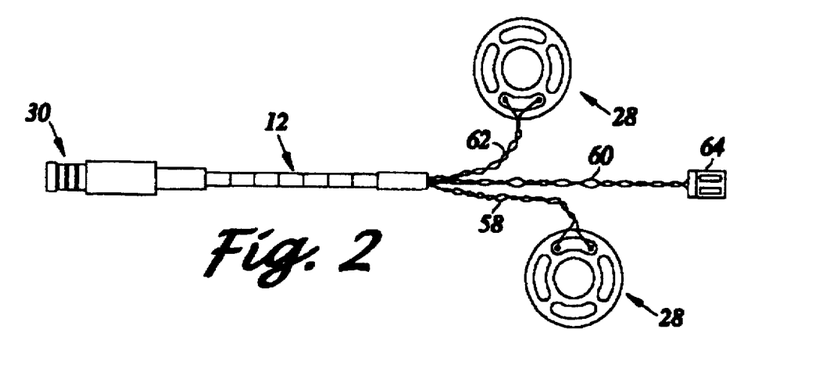
FIG. 2 is a diagram further illustrating the helmet harness of the present invention.

FIG. 2 is a diagram further illustrating the helmet harness 12 of the present invention. The helmet harness 12 includes two earphones 28. The sensitivity of each earphone 28 allows for a clear and audible transmission at motorcycle speeds in excess of 70 MPH. Each earphone 28 has a diameter of 1.75 inches and total thickness of 5/16 inches to allow for installation between the shell and liner of the helmet. The dimensions allow for the above-mentioned installation which more readily allows the SNELL safety rating on the helmet to be maintained. The helmet harness 12 has a helmet connector 30 to electrically interconnect it to the other components of the communications system 10. The helmet connector 30 provides for electrical interconnection of helmet cabling 58, 60, and 62. The helmet cabling 58, 60, and 62 is designed for installation between the shell and liner of the helmet with an outside diameter (OD) of no greater than 0.085 inches to allow for easy installation. The cable 62 that is the lead for the microphone assembly 14 is of sufficient length to allow for choice of either left or right side mounting of the microphone assembly 14 in the helmet. The cable 62 has a microphone connector 64 at one end. The microphone connector 64 is keyed to prevent improper mating with the microphone assembly 14.

Figure 3:
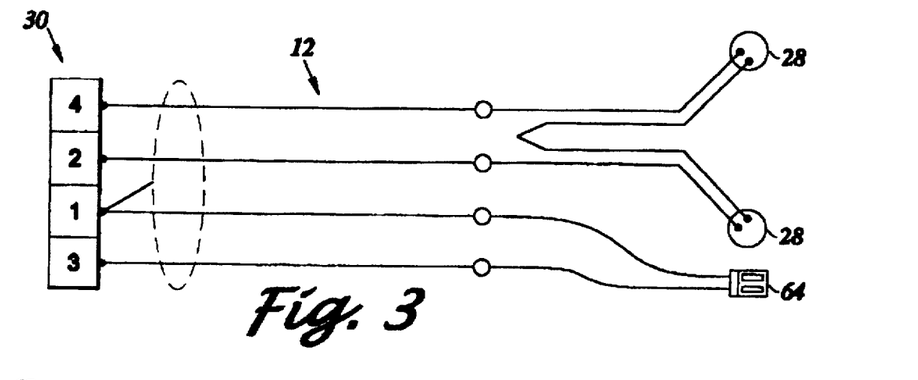
FIG. 3 is a schematic diagram further illustrating the helmet harness of the present invention.

FIG. 3 is a schematic diagram further illustrating the helmet harness 12 of the present invention. The helmet connector 30 has four pins, wherein pin 1 is connected to the minus part of the microphone connector 64, pin 2 is connected to one terminal of one of the earphones 28, pin 3 is connected to the positive terminal of the microphone connector 64, and pin 4 is connected to one terminal of the other earphone 28. A wire then connects the two unoccupied terminals on the earphones 28.

Microphone Assembly

Figure 4:
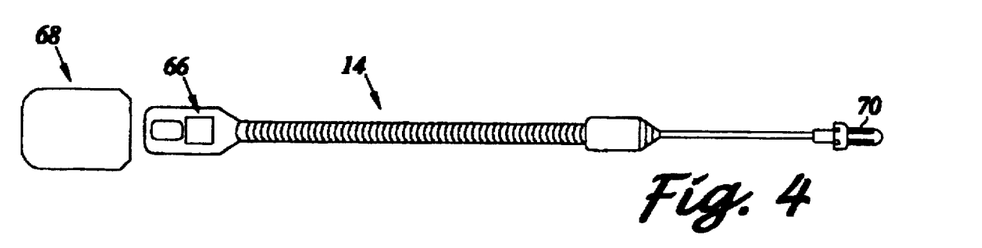
FIG. 4 is a diagram further illustrating the microphone assembly of the present invention.

FIG. 4 is a diagram further illustrating the microphone assembly 14 of the present invention. The microphone assembly 14 is a black flexible boom type that is adjustable for length outside the helmet. The recommended nominal adjusted length is 6.5 inches, but can be adjusted for longer or shorter outside mounting lengths. The boom diameter is 4 mm and the head of the microphone 12 has a maximum outside diameter of 0.40 inches. The microphone assembly 14 can be installed on either the left or right side of the helmet. The microphone 66 within the assembly 14 is a noise-cancelling electret type that is designed to provide the rider with clear speech transmission at highway speeds in excess of 70 MPH when used with a windscreen 68. The windscreen 68 diameter is 1.125 inches and is secured to the head of the microphone 66. A connector 70 for the microphone assembly 14 is keyed for polarity to guarantee correct mating to the microphone connector 64 of the helmet harness 12. The microphone assembly 14 allows for a low profile, inside-the-helmet installation, under the cheekguard faceplate mounting screw of the helmet. This type of installation keeps the rider's vision from being impaired and more readily allows the SNELL safety rating on the helmet to be kept intact.

Figure 5:
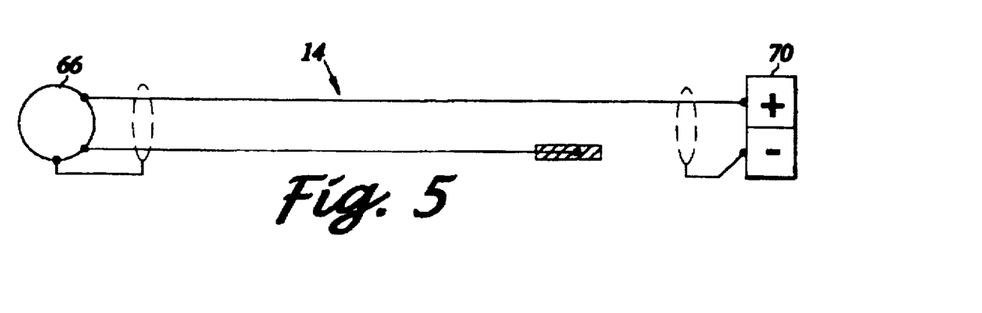
FIG. 5 is a schematic diagram further illustrating the microphone assembly of the present invention.

FIG. 5 is a schematic diagram further illustrating the microphone assembly 14 of the present invention. The microphone 66 is connected to the positive terminal of the microphone connector 70. The negative terminal of the microphone 66 is connected to the shield of the assembly 14, which is then connected to the negative terminal of the connector 70.

Breakaway Cable Assembly

Figure 6:
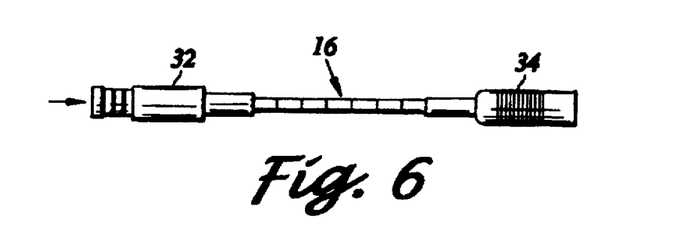
FIG. 6 is a diagram further illustrating the breakaway cable assembly of the present invention.

FIG. 6 is a diagram further illustrating the breakaway cable assembly 16 of the present invention. The breakaway cable assembly 16 includes an external connector 32 and a breakaway connector 34. The breakaway cable assembly 16 provides a non-locking, "quick disconnect" electrical link between the helmet and the radio adapter 36. The external connector 32 is preferably female and the breakaway connector 34 is preferably male, and both preferably comply with military specification M9177. The overall length is 36+/−1 inches. The cable element of the breakaway cable assembly 16 is of either a polyethylene or a polyurethane outer jacket with an outside diameter of no greater than 0.130 inches. The cable element diameter and construction is significant in this application, since its narrow size and strength keep it from catching on the rider's uniform or foreign objects. This increased manageability allows the rider to more easily keep the breakaway cable assembly 16 close to his uniform and significantly decreases the chances of accidental disconnection and/or damage. The cable element is also shielded and strain relieved, providing increased integrity.

Figure 7:
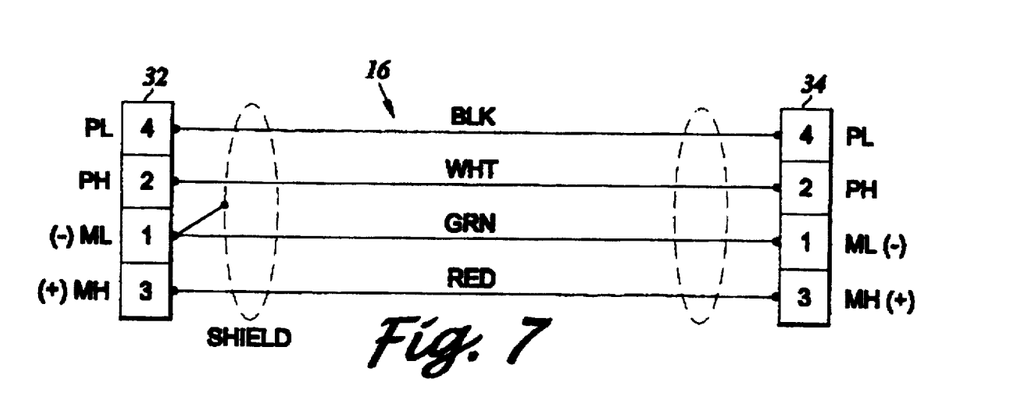
FIG. 7 is a schematic diagram further illustrating the breakaway cable assembly of the present invention.

FIG. 7 is a schematic diagram further illustrating the breakaway cable assembly 16 of the present invention. The external connector 32 and breakaway connector 34 each have four pins associated therewith that are connected straight through. In addition, pin 1 of external connector 32 is connected to the shield for the breakaway cable assembly 16.

Radio Adapter Assembly

Figure 8:
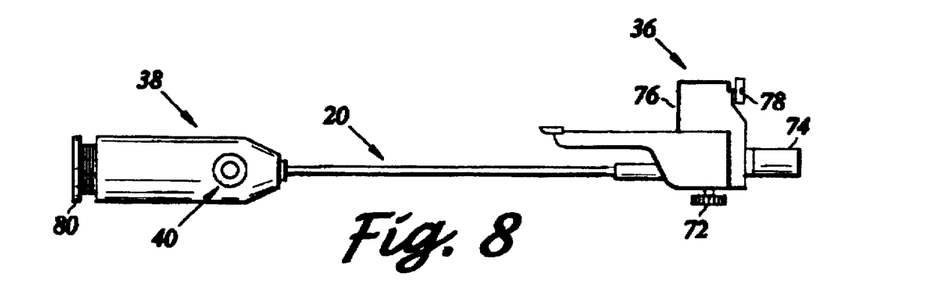
FIG. 8 is a diagram further illustrating the radio adapter assembly of the present invention.

FIG. 8 is a diagram further illustrating the radio adapter assembly 20 of the present invention. The radio adapter assembly 20 is comprised of the radio adapter 36 and the jack and switch assembly 38. The radio adapter assembly 20 is designed to provide both transmit and receive signals to the helmet without interfering with the radio holster. The radio adapter assembly 20 mounts to the radio 18 by means of a thumbscrew 72, allowing the rider to remove the radio adapter 36 from the radio 18 by hand without the use of any tools. The connection to the breakaway cable assembly 16 is made directly by means of a firmly affixed, non-locking female jack 74, meeting military specification M9177, and without the use of a belt box. The jack 74 protrudes less than two inches above the body of the radio 18. The radio adapter assembly 20 is additionally secured to the radio 18 with an accessory adapter collar 76 and SMA antenna nut 78. This design configuration allows for a simple, mechanically reliable, single-handed type mating to the breakaway cable assembly 16. A push-to-talk (PTT) switch 40 is shown integrated with jack and switch assembly 38, but is not required to be integrated as such. The radio adapter assembly 20 allows Push-To-Talk (PTT) signals from the microphone assembly 14 and radio 18 to be passed to and from the motorcycle harness assembly 22. The radio adapter assembly 20 provides a no-delay transmit and receive feature when mounted to the radio 18. The length of the radio adapter assembly 20 is sufficient to allow the jack and switch assembly 38 to clear a large radio 18 battery by 1 inch +/−1 inch. The interface connector 80 portion of the jack and switch assembly 38 is a female connector, in accordance with military specification M8805, and incorporates one or more switches 40 mounted in the backshell for use by the rider when disconnected from the motorcycle harness assembly 22.

Figure 9:
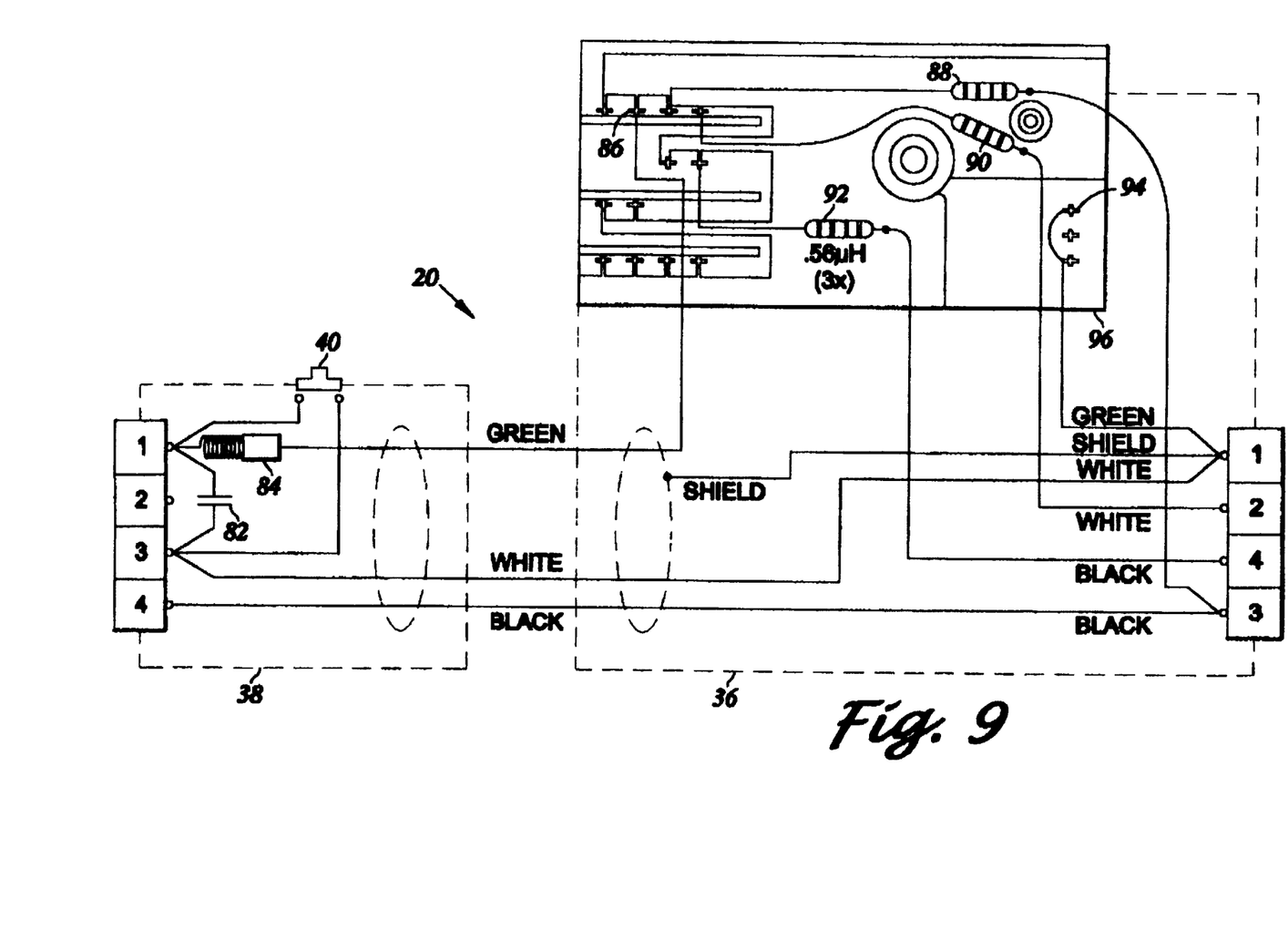
FIG. 9 is a schematic diagram further illustrating the radio adapter assembly of the present invention.

FIG. 9 is a schematic diagram further illustrating the radio adapter assembly 20 of the present invention. In the radio adapter assembly 20, pin 1 of the jack and switch assembly 38 is connected to pin 3 via a capacitor 82. The capacitor 82 is typically a 100 picofarad (pF) capacitor. Pin 1 is also connected to one terminal of the switch 40 and an RF choke 84. The RF choke 84 is connected to radio bus terminal 86. Pin 3 is connected to the other terminal of the switch 40. Pin 3 is also connected to pin 1 of the radio adapter 36. Pin 4 of the jack and switch assembly 38 is connected to pin 3 of the radio adapter 36. Radio bus terminal 86 is connected to choke 88, choke 90, and choke 92. Choke 88 is connected to pin 3 of the radio adapter 36. Choke 90 is connected to pin 2 of the radio adapter 36. Choke 92 is connected to pin 4 of the radio adapter 36. Pin 1 of radio adapter 36 is connected to the shield of the radio adapter assembly 20. Pin 1 is also connected to pin 94 on the board assembly 96.

Motorcycle Harness Assembly

Figure 10:
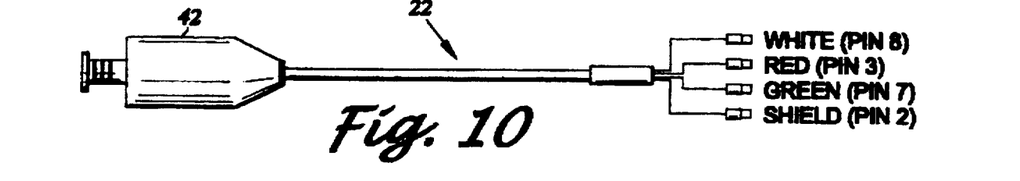
FIG. 10 is a diagram further illustrating a portion of the motorcycle harness assembly of the present invention.

FIG. 10 is a diagram further illustrating a portion of the motorcycle harness assembly 22 of the present invention. More specifically, FIG. 10 further illustrates the rider interface cable portion of the motorcycle harness assembly 22, including the rider harness connector 42 and the male connectors to the interface connector 44 (not shown). In the preferred embodiment, the outer jacket construction of the cable elements of the motorcycle harness assembly 22 is either polyurethane or polyethylene and has an outer diameter of no greater than 0.130 inches in order to provide easy routing and installation along the frame of the motorcycle. The length of the motorcycle harness assembly 22 is sufficient to allow for installation of the public address system 26 in the left rear saddlebag of the motorcycle.

Figure 11:
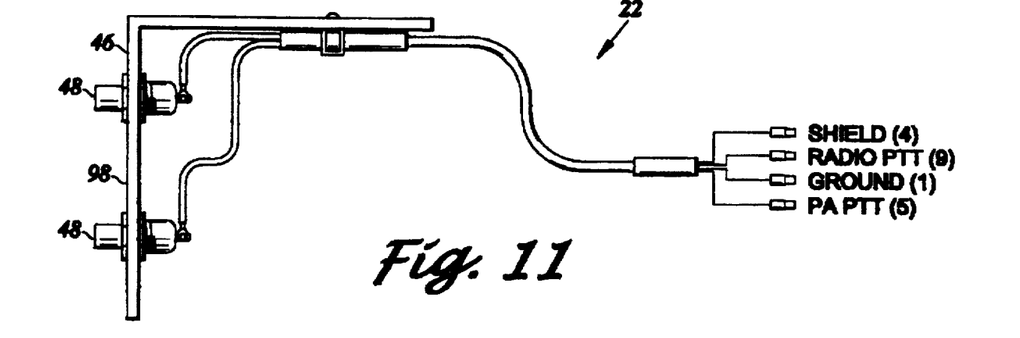
FIG. 11 is a diagram further illustrating the switch assembly of the present invention.

FIG. 11 is a diagram further illustrating the switch assembly 46 of the present invention. The handlebar switch assembly 46, which mounts on the handlebars of the motorcycle, includes one or more handlebar-mounted Push-To-Talk (PTT) switches 48 for remote operation of the radio 18 and public address system 26. The switches 48 are attached to an aluminum bracket 98 that mounts under the left handlebar grip of the motorcycle for easy access and use with a gloved hand. The switches 48, which meet military specification MS25089, include a distinct detent when pressed and preferably are waterproof. In the preferred embodiment, the switch 48 for the radio 18 (on top) is black in color and the switch 48 for the public address system 26 (on bottom) is red in color.

Public Address Interface Assembly

Figure 12:
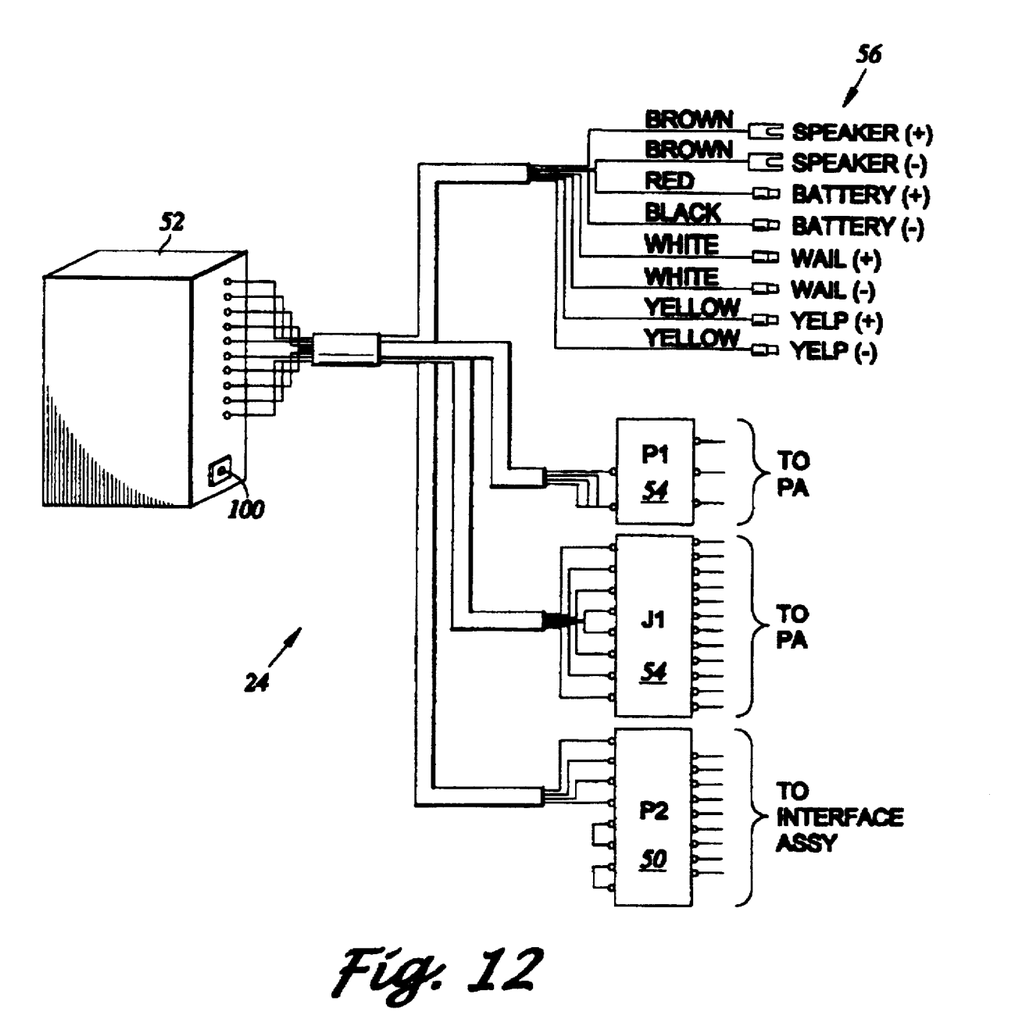
FIG. 12 is a diagram further illustrating the public address interface assembly of the present invention.

FIG. 12 is a diagram further illustrating the public address interface assembly 24 of the present invention. The public address interface assembly 24 contains an amplifier connector 50 that couples to the interface connector 44 of the motorcycle harness assembly 22, a preamplifier 52, a public address interface connector 54 that couples to the public address system 26, and a horn, power and control interface connector 56. The pre-amplifier 52 provides a volume control adjustment 100 for the public address system 26 when the rider is speaking through the microphone assembly 14.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A motorcycle communications system, comprising:
 a motorcycle having a public address (PA) system mounted thereon;
 a two-way radio carried by the motorcycle's rider;
 a helmet worn by the motorcycle's rider having one or more earphones and a microphone attached thereto; and
 an electrical interconnect assembly for electrically interconnecting the earphones and the microphone in the helmet with the two-way radio and the public address system, wherein the electrical interconnect assembly includes one or more switches for electrically connecting the microphone in the helmet to either the two-way radio or the public address system.

2. The motorcycle communications system of claim 1, wherein the earphones comprise surround-sound earphones.

3. The motorcycle communications system of claim 1, wherein the switches comprise a first push-to-talk switch for connecting the microphone to the two-way radio.

7

4. The motorcycle communications system of claim 3, wherein the switches comprise a second push-to-talk switch for connecting the microphone to the two-way radio and a third push-to-talk switch for connecting the microphone to the public address system.

5. The motorcycle communications system of claim 4, wherein the first switch is carried by the motorcycle's rider, and the second and third push-to-talk switches are mounted on the motorcycle.

6. The motorcycle communications system of claim 5, wherein the first push-to-talk switch connects the microphone to the two-way radio when the electrical interconnect assembly is both electrically connected and disconnected to the public address system.

7. The motorcycle communications system of claim 1, wherein the electrical interconnect assembly comprises:

a first assembly mounted on a motorcycle having a first push-to-talk switch for operating the two-way radio, a second assembly removably coupled and electrically connected to the helmet, the two-way radio, and the first assembly, the second assembly having a second push-to-talk switch located proximate to and carried by the motorcycle rider for operating the two-way radio, wherein the first push-to-talk switch works to operate the two-way radio when the second assembly is electrically connected to the first assembly, and the second push-to-talk switch works to operate the two-way radio when the second assembly is both electrically connected and disconnected to the first assembly.

8. The motorcycle communications system of claim 7, wherein the first push-to-talk switch is electrically parallel to the second push-to-talk switch.

9. The motorcycle communications system of claim 7, wherein the first assembly further comprises a third push-to-talk switch for operating the public address system.

10. The motorcycle communications system of claim 7, wherein the first assembly is coupled to a power connector on the motorcycle for supplying electrical power to the two-way radio when connected therewith.

11. The motorcycle communications system of claim 7, further comprising a breakaway cable assembly coupled between the helmet and the second assembly.

12. The motorcycle communications system of claim 1, wherein the electrical interconnect assembly includes a fixed helmet jack for connecting to the helmet.

13. The motorcycle communications system of claim 12, wherein the fixed helmet jack is molded into the electrical interconnect assembly.

14. A communications interconnect assembly, comprising:

an electrical interconnect assembly comprising one or more electrical cables and connectors, the electrical interconnect assembly being removably coupled and electrically connected via the electrical cables and connectors to one or more earphones and a microphone, a two-way radio, and a public address (PA) system, wherein the electrical interconnect assembly includes one or more switches for selectively connecting the microphone to the two-way radio and the public address system.

15. The communications interconnect assembly of claim 14, wherein the earphones comprise surround-sound earphones.

16. The communications interconnect assembly of claim 14, wherein the switches comprise a first push-to-talk switch for connecting the microphone to the two-way radio.

8

17. The communications interconnect assembly of claim 16, wherein the switches comprise a second push-to-talk switch for connecting the microphone to the two-way radio and a third push-to-talk switch for connecting the microphone to the public address system.

18. The communications interconnect assembly of claim 16, wherein the first push-to-talk switch connects the microphone to the two-way radio when the electrical interconnect assembly is both electrically connected and disconnected to the public address system.

19. The communications interconnect assembly of claim 14, wherein the electrical interconnect assembly comprises:

a first assembly having a first push-to-talk switch for operating the two-way radio, a second assembly removably coupled and electrically connected to the speakers, the microphone, the two-way radio, and the first assembly, the second assembly having a second push-to-talk switch for operating the two-way radio, wherein the first push-to-talk switch works to operate the two-way radio when the second assembly is electrically connected to the first assembly, and the second push-to-talk switch works to operate the two-way radio when the second assembly is both electrically connected and disconnected to the first assembly.

20. The communications interconnect assembly of claim 19, wherein the first push-to-talk switch is electrically parallel to the second push-to-talk switch.

21. The communications interconnect assembly of claim 19, wherein the first assembly further comprises a third push-to-talk switch for operating the public address system.

22. The communications interconnect assembly of claim 19, wherein the first assembly is coupled to a power connector for supplying electrical power to the two-way radio when connected therewith.

23. The communications interconnect assembly of claim 19, further comprising a breakaway cable assembly coupled between the earphones and the microphone and the second assembly.

24. A radio assembly, comprising:

a public address (PA) system;

a two-way radio;

a microphone; and an electrical interconnect assembly for electrically interconnecting the microphone, the two-way radio, and the public address system, wherein the electrical interconnect assembly includes at least one push-to-talk switch, wherein the push-to-talk switch selectively connects the microphone to the two-way radio and the public address system and wherein a first push-to-talk switch connects the microphone to the two-way radio when the electrical interconnect assembly is both electrically connected and disconnected to the public address system.

25. The radio assembly of claim 24, wherein the push-to-talk switches comprise a first push-to-talk switch and a second push-to-talk switch for connecting the microphone to the two-way radio and a third push-to-talk switch for connecting the microphone to the public address system.

26. The radio assembly of claim 24, wherein the electrical interconnect assembly comprises:

a first assembly having a first push-to-talk switch for operating the two-way radio, a second assembly removably coupled and electrically connected to the microphone, the two-way radio, and the first assembly, the second assembly having a second push-to-talk switch for operating the two-way radio, wherein the first push-to-talk switch works to operate the two-way radio when the second assembly is electrically connected to the first assembly, and the second push-to-talk switch works to operate the two-way radio when the second assembly is both electrically connected and disconnected to the first assembly.

27. The radio assembly of claim 26, wherein the first push-to-talk switch is electrically parallel to the second push-to-talk switch.

28. The radio assembly of claim 27, wherein the first assembly is coupled to a power connector for supplying electrical power to the two-way radio when connected therewith.

29. The radio assembly of claim 27, further comprising a breakaway cable assembly coupled between the microphone and the second assembly.

30. The radio assembly of claim 26, wherein the first assembly further comprises a third push-to-talk switch for operating the public address system.

* * * * *